(12) United States Patent
Knight

(10) Patent No.: US 9,302,603 B1
(45) Date of Patent: Apr. 5, 2016

(54) SEAT COVERING

(71) Applicant: Martell Knight, Grand Prairie, TX (US)

(72) Inventor: Martell Knight, Grand Prairie, TX (US)

( * ) Notice: Subject to any disclaimer, the term of this patent is extended or adjusted under 35 U.S.C. 154(b) by 0 days.

(21) Appl. No.: 14/667,216

(22) Filed: Mar. 24, 2015

Related U.S. Application Data

(63) Continuation-in-part of application No. 13/864,651, filed on Apr. 17, 2013.

(51) Int. Cl.
*B60N 2/60* (2006.01)
*B60N 2/48* (2006.01)

(52) U.S. Cl.
CPC ... *B60N 2/60* (2013.01); *B60N 2/48* (2013.01)

(58) Field of Classification Search
CPC ........................................................ B60N 2/60
USPC ......................................................... 297/220
See application file for complete search history.

(56) References Cited

U.S. PATENT DOCUMENTS

| | | | | |
|---|---|---|---|---|
| 3,916,447 A * | 11/1975 | Thompson | ............................ | 2/46 |
| 4,019,776 A * | 4/1977 | Takamatsu | .................. | 297/219.1 |
| 4,694,511 A * | 9/1987 | Estes et al. | ........................... | 2/69 |
| 5,228,745 A * | 7/1993 | Hazel | .............................. | 297/229 |
| 5,403,066 A * | 4/1995 | Drum | ........................... | 297/219.1 |
| 5,655,813 A * | 8/1997 | Kirkpatrick | .................... | 297/220 |
| 6,655,735 B1 * | 12/2003 | Learning | ..................... | 297/228.1 |
| 6,817,664 B1 * | 11/2004 | Tang et al. | ..................... | 297/229 |
| 7,000,984 B1 * | 2/2006 | Ward | ........................ | 297/228.12 |
| 7,600,813 B2 * | 10/2009 | Lanham et al. | ................ | 297/229 |
| 7,931,335 B1 * | 4/2011 | Siklosi et al. | ................. | 297/229 |
| 8,147,000 B1 * | 4/2012 | Drake | ....................... | 297/452.41 |
| 8,585,141 B2 * | 11/2013 | Limpaitoon | ................ | 297/230.1 |
| 8,733,836 B2 * | 5/2014 | Gross | ........................ | 297/228.12 |
| 2007/0040426 A1 * | 2/2007 | Kenny | ........................... | 297/229 |
| 2007/0157355 A1 * | 7/2007 | Katsin | ................................. | 2/22 |
| 2007/0262624 A1 * | 11/2007 | Snedeker | .................... | 297/219.1 |
| 2008/0093900 A1 * | 4/2008 | Gold et al. | ............... | 297/219.12 |
| 2008/0231095 A1 * | 9/2008 | Brauning | ..................... | 297/219.1 |
| 2008/0315643 A1 * | 12/2008 | Beroth et al. | .................. | 297/229 |
| 2012/0086248 A1 * | 4/2012 | Morabito | ................. | 297/219.11 |

* cited by examiner

*Primary Examiner* — David R Dunn
*Assistant Examiner* — Timothy J Brindley
(74) *Attorney, Agent, or Firm* — Plager Schack LLP

(57) ABSTRACT

An improved seat covering protects a vehicle seat from being contaminated with a fluid. The improved seat covering includes a seat covering which has a first layer mechanically coupled to a second layer, where the second layer is made from a hydrophobic material which prevents the fluid from contaminating the vehicle seat this can prevent the fluid from contaminating a cloth seat and also prevents the fluid from damaging a leather seat.

1 Claim, 3 Drawing Sheets

SEAT COVERING

RELATED APPLICATION

This application is a continuation-in-part of non-provisional patent application U.S. Ser. No. 13/864,651 filed on Apr. 17, 2013, the entire contents of which is herein incorporated by reference.

FIELD OF THE INVENTION

This invention relates to automotive accessories.

BACKGROUND OF THE INVENTION

Prior to the disclosed invention no device could serve as an adequate barrier between an individual and a seat in an automobile. Sweat can damage leather seats and impart an unfriendly odor in cloth seats. The present invention solves both problems.

BRIEF SUMMARY OF THE INVENTION

An improved seat covering protects a vehicle seat from being contaminated with a fluid. The improved seat covering includes a seat covering which has a first layer mechanically coupled to a second layer, where the second layer is made from a hydrophobic material which prevents the fluid from contaminating the vehicle seat this can prevent the fluid from contaminating a cloth seat and also prevents the fluid from damaging a leather seat.

BRIEF DESCRIPTION OF THE SEVERAL VIEWS OF THE DRAWINGS

Figure 1:
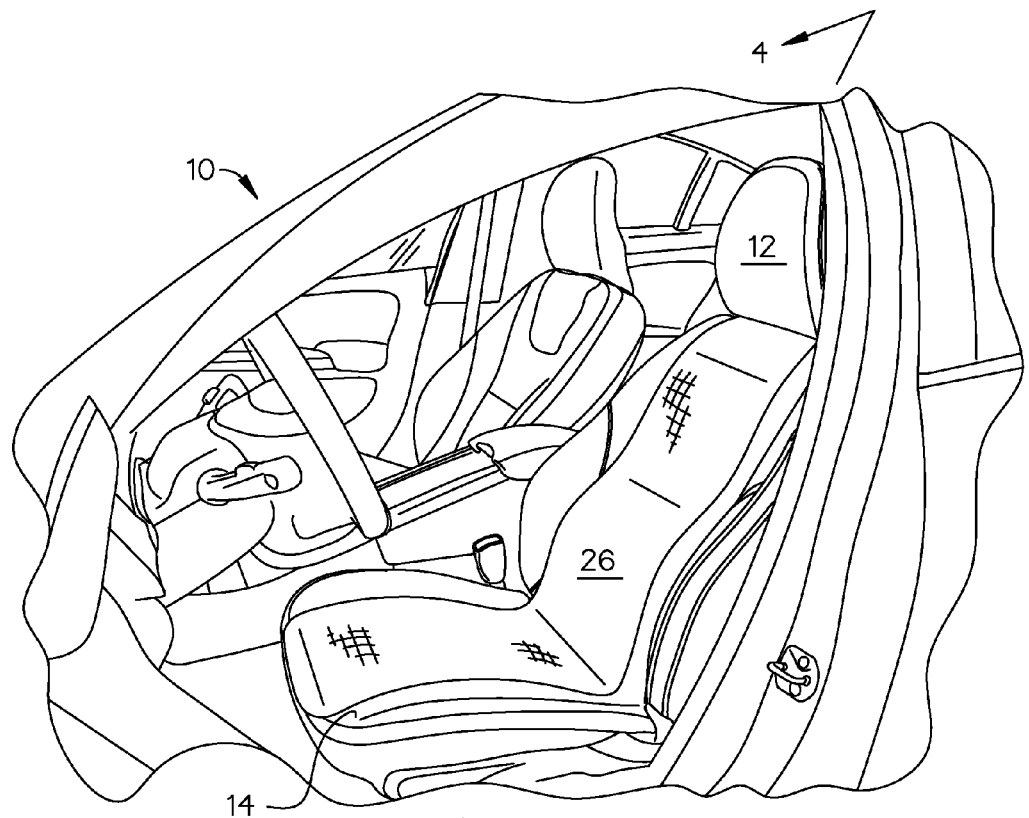

Having thus described the invention in general terms, reference will now be made to the accompanying drawings, which are not necessarily drawn to scale, and wherein:

FIG. 1 is a perspective view of an embodiment of the invention shown in use.

Figure 2:
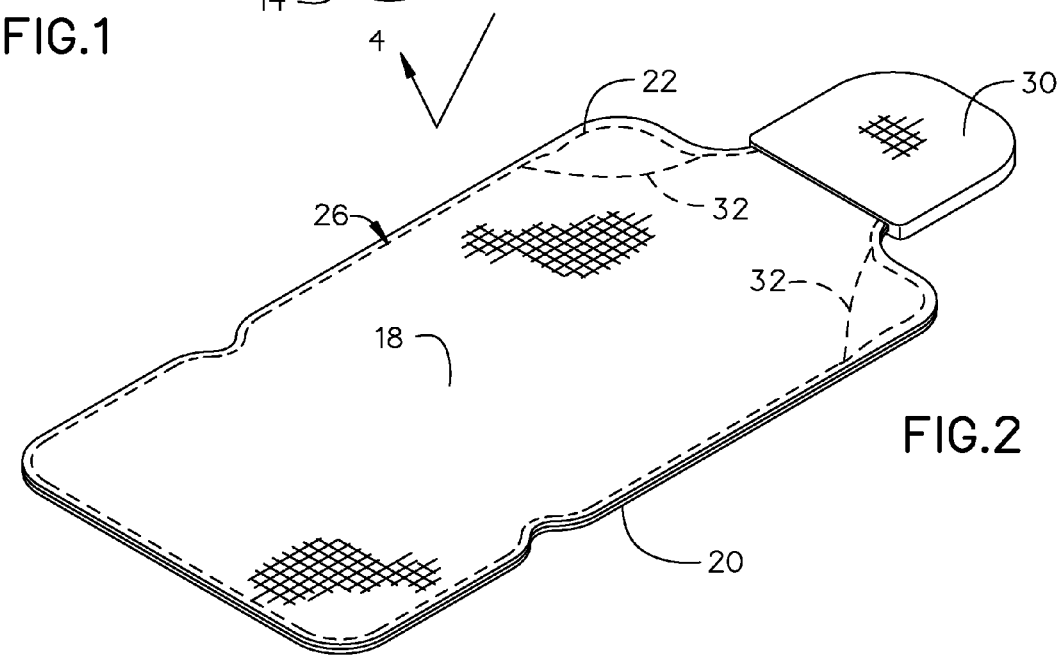

FIG. 2 is a perspective view of an embodiment of the invention.

Figure 3:
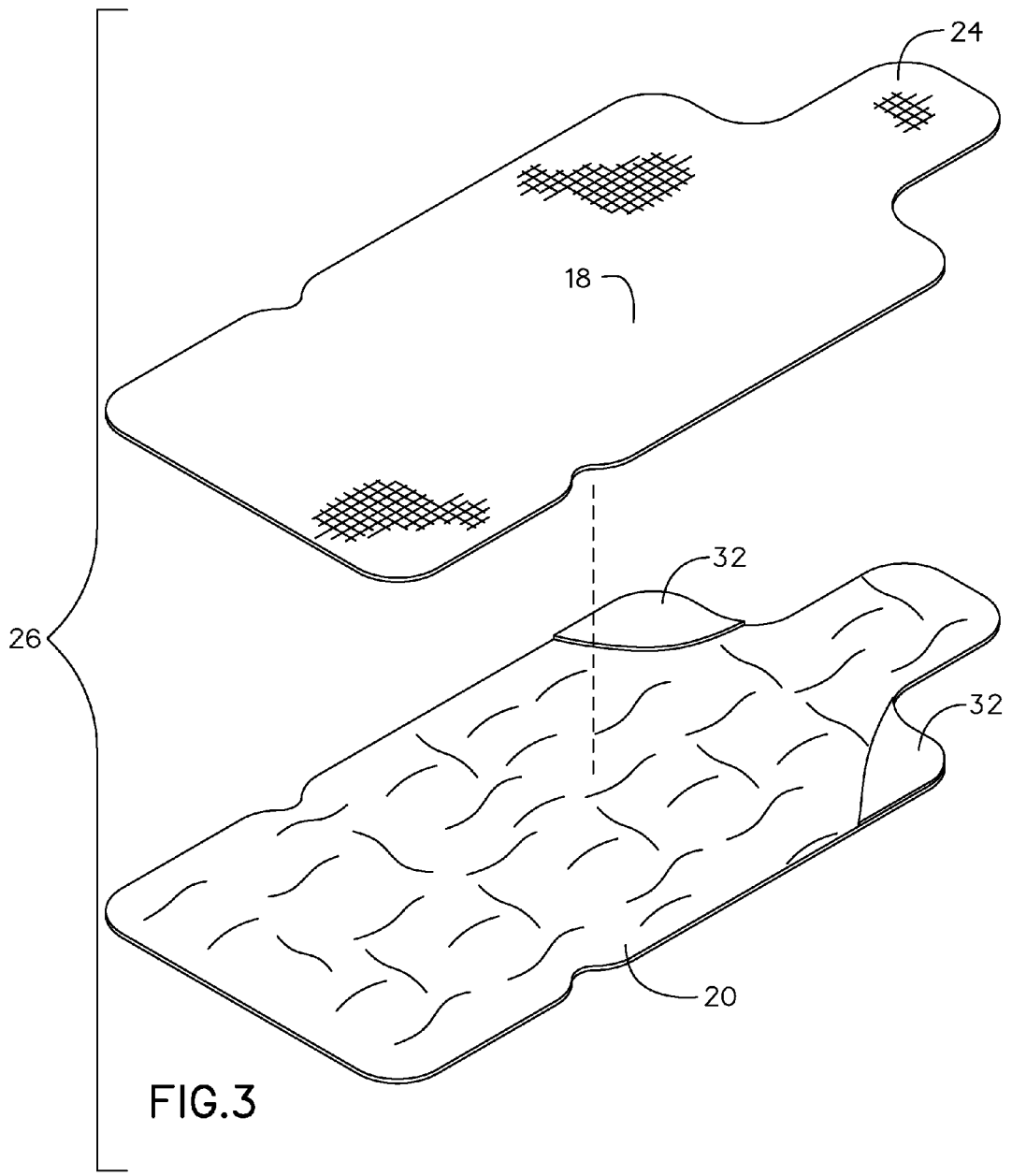

FIG. 3 is an exploded view of an embodiment of the invention component layers.

Figures 4, 5, 6:
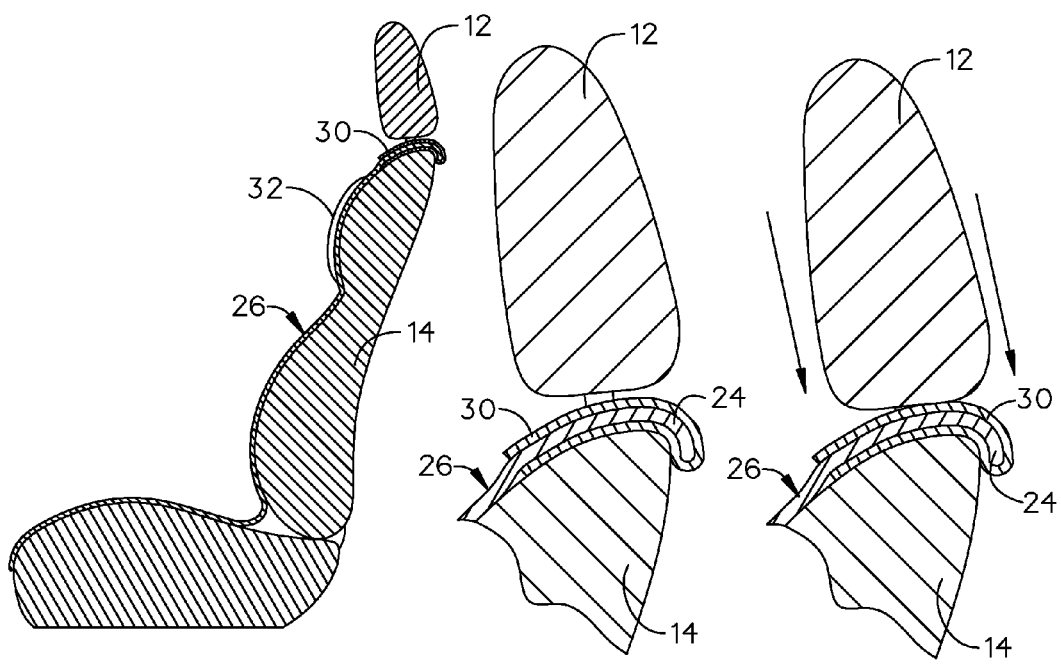

FIG. 4 is a section view of an embodiment of the invention along line 4-4 in FIG. 1 illustrating overall placement.

FIG. 5 is a section detail view of an embodiment of the invention illustrating the stabilizing portion placement.

FIG. 6 is a section detail view of an embodiment of the invention illustrating the stabilizing portion in locked configuration via item the vehicle seat headrest.

Figure 7:
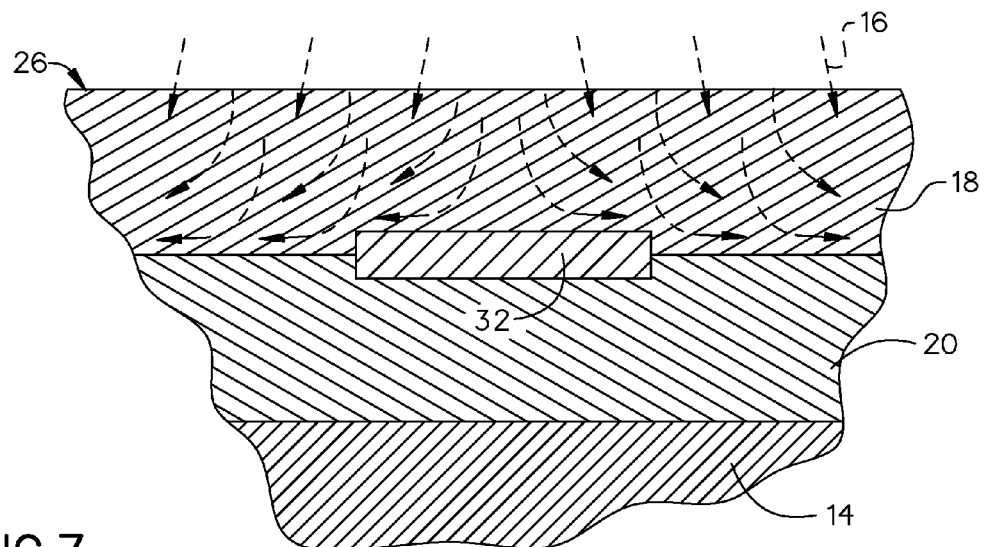

FIG. 7 is a section detail view of an embodiment of the invention exemplifying moisture interface with component layers.

DETAILED DESCRIPTION OF THE INVENTION

Embodiments of the present invention overcome many of the obstacles associated with sweat on car seats, and now will be described more fully hereinafter with reference to the accompanying drawings that show some, but not all embodiments of the claimed inventions. Indeed, the invention may be embodied in many different forms and should not be construed as limited to the embodiments set forth herein. Rather, these embodiments are provided so that this disclosure will satisfy applicable legal requirements. Like numbers refer to like elements throughout.

FIG. 1 shows an embodiment of an improved seat covering in use. Vehicle 10 is mechanically coupled to vehicle seat 14. Vehicle seat 14 is mechanically coupled to vehicle seat headrest 12. An embodiment of the disclosed invention is seat covering 26, which is shown in more detail in FIG. 2 and FIG. 3.

FIG. 2 and FIG. 3 show seat covering 26 in more detail. Seat covering 26 comprises first layer 18 mechanically coupled to second layer 20 with stitching 22. A first end of first layer 18 terminates in first layer terminating portion 24 with two shoulder portions. Likewise, a first end of second layer 20 terminates second layer terminating portion 24 with two shoulder portions 32. First shoulder portion 32 is mechanically coupled to first layer 18 Combined, first layer terminating portion 24 and second layer terminating portion 24 form stabilizing portion 24 with two lateral seams which can be used as indicated in FIG. 4, FIG. 5 and FIG. 6. In some embodiments, high friction cover 30 can be placed over stabilizing portion 24.

As is known in the art, vehicle head rest 12 can move proximate and distant vehicle seat 14. Vehicle head rest 12 has a first support and a second support that are offset by a support distance. To install seat covering 26, a user can lift vehicle head rest 14, place stabilizing portion 24 beneath vehicle head rest 12. The user can then collapse vehicle head rest 12 onto stabilizing portion 24 in order to hold seat covering 26 in place. In some embodiments, placing high friction cover 30 onto stabilizing portion 24 prohibits a user moving on seat covering 26 from dislodging seat covering 26 from beneath headrest 12. In some embodiments, high friction cover 30 can be made from a rubber mesh. This demonstrates that stabilizing portion 24 can be detachably coupled to vehicle head rest 12.

FIG. 7 shows one embodiment of seat covering 26. Here, first layer 18 is made of a fluid wicking material that can wick fluid from seat covering 26. First layer 18 can be made from a fabric such as cotton or microfiber which provides comfort to the user in addition to wicking fluid. Second layer 20 can be made from a hydrophobic material and should serve as a barrier keeping fluid 16 away from vehicle seat 14. In some embodiments, the hydrophobic layer can be a tarp. Once installed, seat covering 26 will protect vehicle seat 14 by keeping fluid 16 from contaminating vehicle seat 16. This can prevent a user's sweat from contaminating a cloth seat and also prevents sweat from damaging a leather seat.

That which is claimed:

1. A seat and covering system comprising,
a vehicle seat attached to a vehicle seat headrest with a first headrest support and a second headrest support; wherein the first headrest support and the second headrest support are set apart by a known distance;
a seat covering comprising a first layer mechanically coupled to a second layer, wherein the second layer is made from a hydrophobic material which prevents the fluid from contaminating the vehicle seat this can prevent the fluid from contaminating a cloth seat and also prevents the fluid from damaging a leather seat; the seat covering further comprises a first end terminating in a stabilizing portion with shoulder-like portions such that the stabilizing portion is narrower than the known distance and configured to fit between the first headrest support and the second headrest support and between the vehicle seat and the vehicle seat headrest;

a high friction covering slipped over the stabilizing portion in order to prevent the seat covering from dislodging from the vehicle seat cover;

a first shoulder support and a second shoulder support attached between the first layer and the second layer.

* * * * *